July 11, 1933.    L. H. MENNE    1,917,992

PIPE JOINT

Original Filed June 7, 1930

Inventor
L. H. MENNE
By Monroe E. Miller
Attorney

Patented July 11, 1933

1,917,992

UNITED STATES PATENT OFFICE

LOUIS H. MENNE, OF QUINCY, ILLINOIS

PIPE JOINT

Application filed June 7, 1930, Serial No. 459,789. Renewed December 10, 1932.

The present invention relates to improvements in pipe joints and more particularly relates to an improved joint and method for producing same whereby sections of stoves or other pipes may be more effectively secured together.

Another object of the invention is to provide an improved permanent anti-slip joint between the sections of the stove or other pipe, in which the joint will provide an effective seal against leakage through the joint.

A further object of the invention resides in providing an improved method for the production of pipe joints in which, by a simplified series of steps or processes, an improved and more effective joint is provided having anti-slip and sealing qualities of an improved character.

With the foregoing and other objects in view, the invention will be more fully described hereinafter and more particularly pointed out in the appended claims.

In the drawing, wherein like symbols refer to like or corresponding parts throughout the several views.

Figure 1:
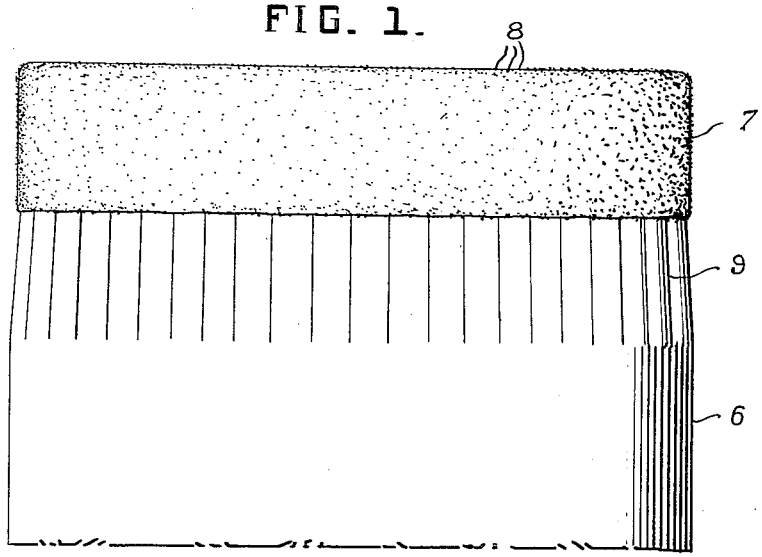
Figure 1 is a fragmentary side view of a pipe section provided with the improved joint.

Referring more particularly to the drawing, 5 and 6 designate adjacent sections of a stove pipe or other pipe to be coupled together by the improved joint. With pipe of this nature, one section is adapted to fit into or telescope with the pipe section mating therewith and a slip joint is this produced.

In accordance with the present method, enamel is sprayed or otherwise applied to the pipe sections 5 and 6, or to one of them; for instance to the inserted end of the pipe section 6. While the enamel is still in a moist condition, the edge of the pipe section 6 is rolled in sand or any other abrasive material, whereby the moist enamelled or painted surface end of the pipe section 6 will acquire a quantity of the sand or other material.

Figure 2:
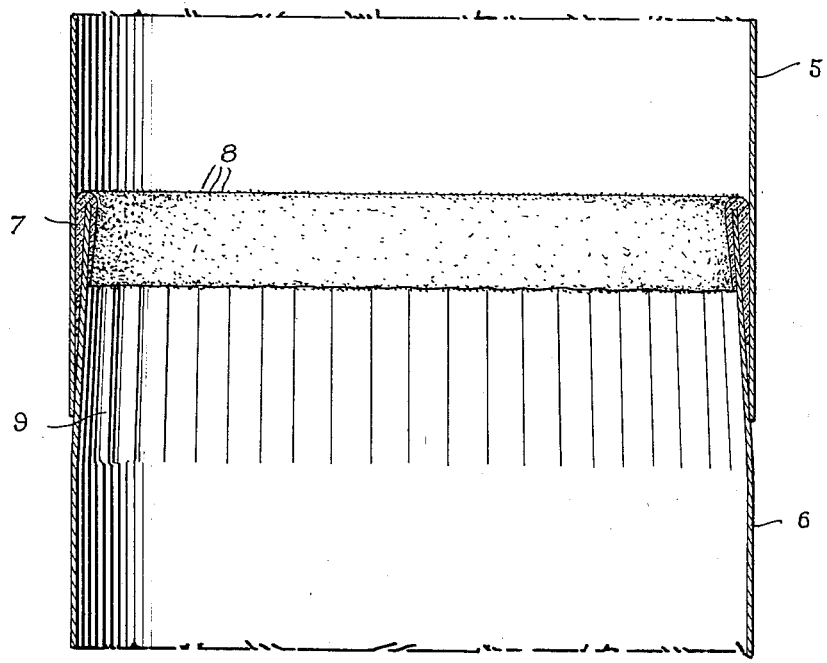
Fig. 2 is a vertical section taken through two fragments of pipe section shown as coupled together by the improved joint.

In Fig. 2 a thick coating of the enamel 7 is shown as having embedded therein sand or other abrasive particles 8. Preferably the interfitting end of the pipe section 6 will be crimped, as indicated at 9, for the purpose of reducing this interfitting end. In such case the enamel 7 may be applied in a thick coating to fill up the gap made by the conical or tapering portion of the pipe end 6, the thickened portion having a cylindrical surface fitting snugly within the end of the adjacent pipe section 5.

When dry, the enamel and sand are fused together at a temperature of approximately 1700° F. The result is a permanent anti-slip joint forming an effective seal between the two pipe sections, being capable of ready assembly and quick removal.

Heretofore with enamelled pipe sections, a piece of paper has been glued on the edge of the pipe to prevent the same from slipping. It has been found that this paper will burn off in time and that the benefit thereof will be thereafter lost. By reason of the present invention, a permanent joint will be provided and one having improved anti-slip qualities over the paper.

The thick enamel coating and sand is preferably carried over into the interior of the pipe section 6, the same being concentric with the outer coating 7. This will have the effect to reinforce and strengthen the outer coating and to give same a substantial backing. Both coatings on outside and inside of the pipe section 6, will also aid in cooperating with the crimp 9 to maintain the pipe section in the formed condition.

Having thus described the invention, what is claimed as new is:

1. A pipe section having a hardened adhesive coating on one end and exposed abrasive material embedded in said coating to frictionally engage another pipe section having a slip joint with the first named pipe section.

2. A pipe section having a hardened adhesive coating on one end and exposed abrasive material embedded in and fused with said coating to frictionally engage another pipe section having a slip joint with the first named pipe section.

3. A pipe section having an enamel coating on one end and exposed sand embedded in said coating to frictionally engage another pipe section having a slip joint with the first named pipe section.

4. A pipe section having an enamel coating on one end and exposed sand embedded in and fused with said coating to frictionally engage another pipe section having a slip joint with the first named pipe section.

5. A pipe section having a crimped end, and a thick coating of hardened adhesive material on said end forming a friction surface to fit a companion slip joint pipe section.

6. A pipe section having a crimped end, and a thick coating on said end forming a cylindrical friction surface to fit a companion slip joint pipe section, and exposed abrasion material embedded in said coating to engage the last named pipe section.

7. A pipe section having a crimped end, and a thick coating of hardened adhesive material extending on the outer and inner surfaces of said end and forming a cylindrical surface to fit a companion slip joint pipe section.

8. A pipe section having a crimped end, a coating of hardened adhesive material extending on the outer and inner surfaces of said end, said coating having exposed abrasive material embedded in the same and forming a cylindrical surface to fit a companion slip joint pipe section.

In testimony whereof I affix my signature.

LOUIS H. MENNE.